United States Patent [19]

Hare

[11] Patent Number: 4,517,745
[45] Date of Patent: May 21, 1985

[54] APPARATUS FOR MEASURING THE SHOULDER OF A DRILL PIPE JOINT

[75] Inventor: Bruce L. Hare, E. Star Rte. 3, Box 53, Bloomfield, N. Mex. 87413

[73] Assignee: Bruce L. Hare, Jr., Bloomfield, N. Mex.

[21] Appl. No.: 490,785

[22] Filed: May 2, 1983

[51] Int. Cl.³ .................... G01B 5/18; G01B 5/16
[52] U.S. Cl. .................... 33/169 B; 33/531; 33/535; 33/199 R; 33/544
[58] Field of Search ............ 33/174 Q, 174 E, 174 N, 33/DIG. 18, 199 R, 169 B, 143 G, 143 H

[56] References Cited

U.S. PATENT DOCUMENTS

| | | | |
|---|---|---|---|
| 763,076 | 6/1904 | Spalding | 33/169 B |
| 1,248,340 | 11/1917 | Kinney | 33/169 B |
| 1,543,244 | 6/1925 | Blood . | |
| 2,179,658 | 11/1939 | Gallagher . | |
| 2,200,181 | 5/1940 | Lamond . | |
| 2,330,453 | 9/1943 | Smith . | |
| 2,622,336 | 12/1952 | Raout . | |
| 2,630,633 | 3/1953 | Webb . | |
| 2,650,435 | 9/1953 | Kidd . | |
| 2,700,224 | 1/1955 | Johnson | 33/199 R |
| 3,015,892 | 1/1962 | Stuart . | |
| 3,170,243 | 2/1965 | Williams | 33/169 |
| 3,225,447 | 12/1965 | Bryant | 33/174 E |
| 3,638,324 | 2/1972 | Kaifesh | 33/174 Q |
| 4,216,585 | 8/1980 | Hatter . | |
| 4,222,174 | 9/1980 | Hauk . | |

FOREIGN PATENT DOCUMENTS

| | | | |
|---|---|---|---|
| 184668 | 2/1956 | Austria | 33/169 B |
| 268711 | 2/1969 | Austria | 33/174 E |

Primary Examiner—William D. Martin, Jr.
Attorney, Agent, or Firm—Gregg I. Anderson

[57] ABSTRACT

A gauge device has an insert portion having means for aligning the insert portion along a longitudinal axis of an oil drill pipe so that the squareness of a joint shoulder and shoulder available for grinding at a box end of an oil drill pipe can be determined. The insert portion has indicia formed thereon calibrated to read the shoulder available at the box end of said drill pipe. An indicator portion of the gauge device is slideable along the insert portion and has a radially directed annular flange extending perpendicular thereto and perpendicular to a longitudinal axis of the oil drill pipe upon insertion of the insert portion within the box end of said oil drill pipe. The squareness of the outer shoulder of the oil drill pipe can be directly visualized by reference to the annular flange of the indicator portion. Field grinding can then be performed on the box end of the oil drill pipe until a square shoulder is obtained. The shoulder available for grinding, with respect to a predetermined bench mark, is also measurable by the position of the indicator portion with respect to the measurement indicia.

6 Claims, 4 Drawing Figures

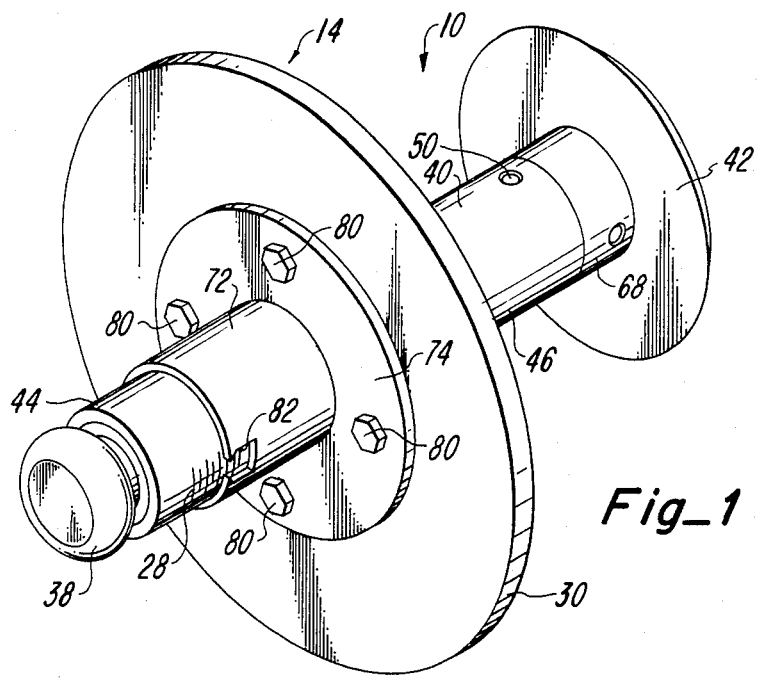
*Fig_1*
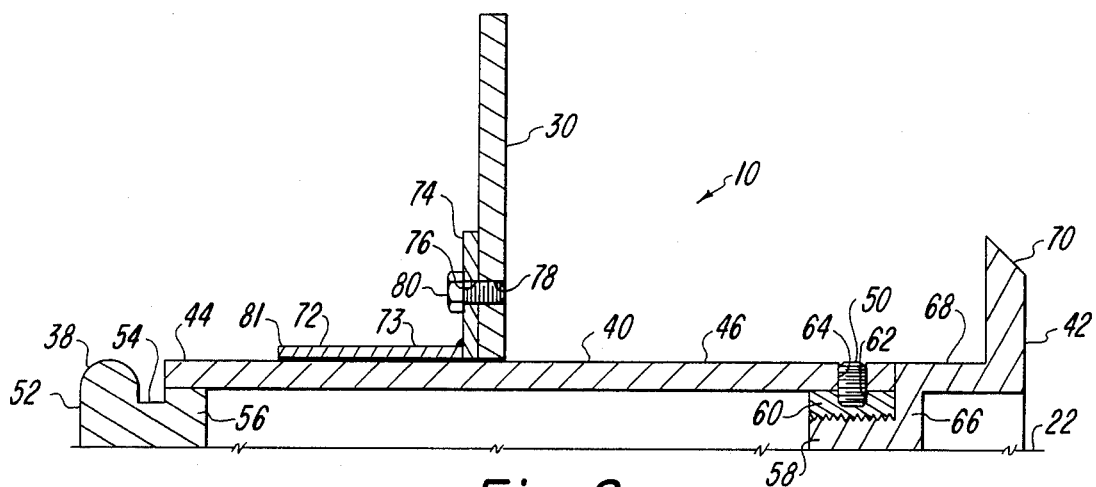
*Fig_2*
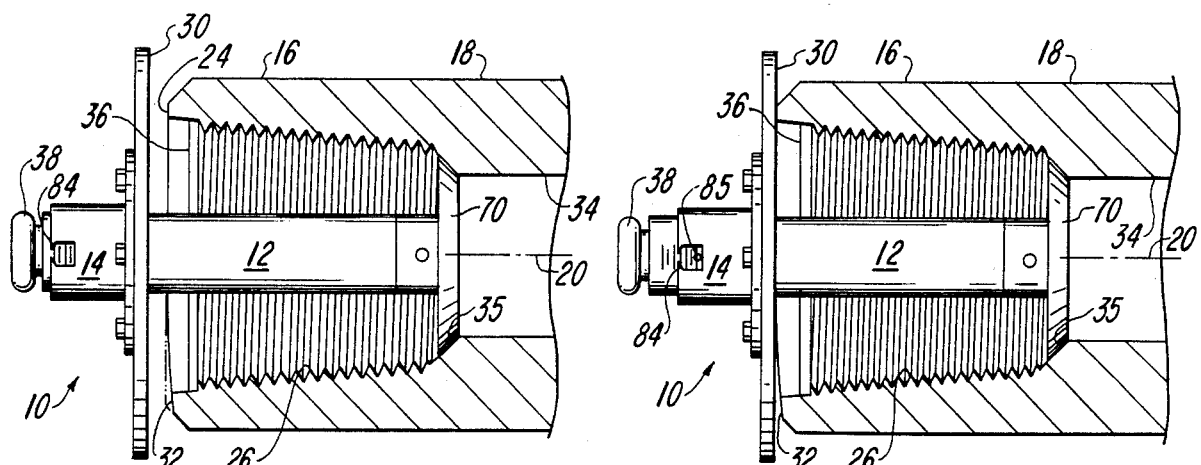
*Fig_3*  *Fig_4*

4,517,745

APPARATUS FOR MEASURING THE SHOULDER OF A DRILL PIPE JOINT

BACKGROUND OF THE INVENTION

1. Field of Invention

The present invention relates generally to gauges for measuring box end depth and squareness of a shoulder of a joint between two threadably connected sections of drill pipe. More specifically, the present invention relates to gauges of the type described which can be utilized in the field.

2. Description of the Prior Art

In oil exploration operations, drill pipe consists of elongated pipe sections having a hollow bore therethrough. One end, the box or female end, of each section of drill pipe has internally tapered threads while the other or male end of each drill pipe has externally tapered threads. Establishing a relatively rigid and sealable threaded connection between two or more sections of drill pipe is necessary to reach the extensive depths necessary for the exploration for and production of oil and natural gas. The hollow oil drill pipe and connected sections thereof often are required to carry liquids or air down or out of the drill pipe, to assist in lubricating the rotating drill bit and cleaning particle cuttings from the hole.

Joints between adjacent sections of drill pipe must be maintained in as rigid a configuration as possible. It is therefore necessary that the female or internally threaded end of each drill pipe section have a square shoulder that flushly abuts the male or externally threaded end of the immediately adjacent section of drill pipe. These rotary shoulder connections must be smoothly sealed in order that the joint between adjacent sections of drill pipe operate with maximum rigidity and sealing efficiency along the length of the drill pipe.

Rigid joints are essential to the rotation of long lengths of drill pipe. The tapered threaded connection alone cannot maintain sufficient rigidity. Only the mating of the square shoulders of adjacent sections of drill pipe can achieve the desired rigidity. A square shoulder is therefore mandatory for rigidity considerations alone. Loss of a joint results in a highly expensive "fishing" job to obtain pipe sections lost down a drill hole.

Fluids, which can be water alone, water in solution with other chemicals, air, or chemicals, are often placed under relatively high pressures as they are forced down the bore of the drill pipe. The pressures under which the fluids are pumped down the drill pipe make it necessary that each joint between adjacent sections of drill pipe be satisfactorily sealed against loss of any of the liquids and further erosion of the joint. A poor seal between adjacent pipe sections permits dirt and grit to get into the area between the shoulders of adjacent pipe sections, greatly increasing erosion and endangering the connection itself. Again, square shoulders are the best means available for making a better, longer lasting seal.

The shoulders can be refaced to obtain the squareness for proper operation in the field. Heretofore, no easily usable measuring tool has been available in the field to allow for the grinding of the shoulder to establish the appropriate squareness and to measure the total depth of the box remaining. Taking a drill pipe section out of the field for work in a machine shop is an expensive and time consuming proposition that should be avoided, if possible.

As the shoulder of the box or female end of a section of drill pipe is repeatedly ground to establish the proper squareness of shoulder, it will, after the operation has been done a number of times, necessarily shorten the box end, ultimately to a point where insufficient shoulder remains to withstand the forces imposed on the rotating connection between drill pipe sections. Measurement of the total box depth is required, in conjunction with any grinding done to the surface. American Petroleum Institute standards establish a minimum distance for new drill pipe sections, which distance is known as $L_{bc}$. The $L_{bc}$ distance is a known quantity for a given pipe section specification. New pipe is also manufactured with a bench mark formed inside the box end defining the minimum box end depth, beyond which the shoulder cannot be ground. Industry standards would prevent grinding within one sixteenth inch of the bench mark. The bench mark is usually obliterated from pipe sections that have been used. It is therefore necessary to gauge the bench mark. This has not been done previously with any accuracy.

No prior art device measures both the box depth and squareness of shoulder on an oil drill pipe section so that field repairs can be made. Devices adapted to measure the depth of a female portion of a threaded connection are known as seen in U.S. Pat. No. 2,330,453 to C. Smith; U.S. Pat. No. 3,015,892 to E. Stuart; and U.S. Pat. No. 1,543,244 to B. Blood. The gauging device of Smith has an outer casing having a slot formed along the length thereof and measurement indicia or marks formed along the edge of the slot. An inner section or tube of the Smith device is slideably received within the outer casing and has a bore along its length. The bore does not pass all the way through the inner section but terminates at a web. The inner section receives a cylindrical socket in each end thereof which socket in turn receives a male depth gauge plug. A key block affixed to the inner section is moved along the slot of the outer section to measure the depth of penetration of the plug, which plug is threadably inserted into the female portion of the threaded connection to be measured. The measurement is not made with reference to maintaining a square shoulder.

The patent to Stuart is a much less complex variation of the principles shown in the patent to Smith. In Stuart, a threaded male end of an inner rod is threadably connected into the female end of the threaded connection to the ultimate depth of that female connection. An outer rod having a cutout portion is slid over the inner rod and the depth of penetration is read on the outer rod by comparing the outer rod position to the inner rod position. Shoulder squareness is not measured and is not a concern to Stuart.

The patent to Blood measures only the correctness of an internally threaded connection and the taper, specifically with relevance toward standard pipe threads. A relatively sliding gauge is shown that is used to determine whether or not the two gauge members are in a proper alignment for the specific type of thread being measured. Deviation of the indicia on the two gauge members from a set zero point indicate improper taper. Shoulder squareness is not measured.

The prior art relating to apparatus or gauges for testing or measuring the squareness of a shoulder of a work piece having a threaded internal bore include U.S. Pat. No. 2,700,224 to S. Johnson and U.S. Pat. No. 2,630,633 to S. Webb. Johnson would check the squareness of a shoulder with respect to an internally threaded bore.

Johnson is specifically applicable to a threaded counterbore within a larger outer bore and, in that respect, a collar having two parallel surfaces is fit into the larger outer bore. The collar gives a reference by which the correctness of the smaller counterbore can be determined.

The Webb patent shows an apparatus for measurement of the squareness of drill pipes. The shoulder is, as was the case in Johnson, measured for squareness relative to the threads of the drill pipe itself. No prior art reference was found that utilizes a throat or tapered inner shoulder existing between the inner termination of the internal threads of a drill pipe and the bore of the drill pipe to align a gauge for measuring squareness of the shoulder and depth of the box end.

U.S. Pat. No. 4,216,585 to Hatter; U.S. Pat. No. 3,170,243 to Williams; and U.S. Pat. No. 1,248,340 to Kinney all show various types of depth gauges, some of which use sliding relationships to establish a depth measurement. Other depth gauges are seen in U.S. Pat. No. 2,179,658 to Gallagher and U.S. Pat. No. 2,650,435 to Kidd. A device that can be used in the field to make a reference mark from which properly torqued connections can be made is seen in U.S. Pat. No. 4,222,174 to Hauk et al. Other types of gauges for measuring thread depth are seen in U.S. Pat. No. 2,200,181 to Lamond and U.S. Pat. No. 2,622,336 to Raout.

From the foregoing, it is seen that a need exists for a simple, easily used field tool for first determining whether a drill pipe shoulder can be squared in the field, and second for measuring the shoulder squareness. Combining a tool for measuring and/or seeing the squareness of a shoulder in order to modify the shoulder, while also determining whether sufficient box end depth remains to make the modification, has not been shown. As previously stated, box end depth must be known to allow for precise connection between drill pipe and to make sure sufficient pipe shoulder exists so that adjacent sections of drill pipe can be rigidly connected and sealed.

OBJECTS AND SUMMARY OF THE INVENTION

The principal object of the present invention is to provide a gauge device which gives a visual indication of the squareness of a female box end joint of an oil drill pipe section.

A related object of the present invention is to provide a gauge device that gives a measured indication of the shoulder available for surface grinding at a female or box end joint of an oil drill pipe section.

A further related object of the present invention is to provide a gauge device that can measure squareness of a shoulder or facing of a female box end device, as well as the shoulder available on the box end joint, without necessity of threadably engaging the threads.

It is a further related object of the present invention to provide a gauge device for visualizing and measuring the circumference of the female box end joint of an oil drill pipe.

In accordance with the objects of the invention, a gauge device for measuring the squareness of a female box end joint of an oil drill pipe section, as well as the shoulder available at the female end of a pipe section, includes an inner insert portion insertable into the female end of an oil drill pipe section and an outer gauge portion slideable along the length of the insert portion. The insert portion has, at the innermost inserted end thereof, alignment means that conformably mate to an inwardly tapered throat or inner shoulder of a drill pipe section at an innermost termination of the internal threads of the female end at or near an area wherein a drill pipe bore extends away from the female end along the length of the oil drill pipe section toward a male or externally threaded end of the pipe section. Measurement indicia formed along an elongated body of the insert portion are readable with respect to the sliding gauge portion to give a measurement of the shoulder available relative to a bench mark formed in the female end.

The gauge portion includes an outwardly directed annular flange that extends perpendicularly away from a longitudinal axis of the insert portion, which insert portion is aligned by the alignment means with a coincident longitudinally axis of the oil drill pipe section. Abutment of the flange against the outer shoulder at a terminal end of the oil drill pipe female joint end gives a visualization of the squareness of the female or box joint end. In addition, the outwardly directed flange is of a larger circumference than that of the female joint end so that a measurement of the circumference of the female joint end can also be made by tracing around the outer circumference of the female joint end and marking the outwardly directed flange, or by markings on the flange itself.

BRIEF DESCRIPTION OF THE DRAWINGS

FIG. 1 is a perspective view of an oil drill pipe joint gauge device of the present invention.

FIG. 2 is a half section of the invention seen in FIG. 1.

FIG. 3 is a fragmentary side view of the invention shown in FIG. 1 being inserted into and aligned with a female joint end of a section of oil drill pipe, which oil drill pipe is shown in section.

FIG. 4 is a view similar to FIG. 3 with the invention shown in FIG. 1 abutted against an outer shoulder of the drill pipe.

DESCRIPTION OF THE PREFERRED EMBODIMENT

An oil drill pipe joint gauge 10, seen in FIG. 1, includes an inner insert portion or alignment means 12 and an indicator or gauge portion 14 slideable along the length of the insert portion 12. The insert portion 12 is insertable into a female or box end 16 of a section or length of oil drill pipe 18 (FIGS. 3 and 4).

The insert portion 12 matingly fits within the female end 16 of the drill pipe 18 so as to position the entire gauge device 10 coaxially with a longitudinal axis 20 of the drill pipe 18. A longitudinal axis 22 (FIG. 2) of the gauge device 10 is therefore coincident to the longitudinal axis 20 of the drill pipe 18.

Once the gauge device 10 is longitudinally aligned within the female end 16 of the drill pipe 18 along longitudinal axis 20, the indicator portion 14 of the gauge device 10 can be slid along the insert portion 12 to rest against an outer shoulder 32 of the drill pipe 18 at a terminal position 24 of the female end 16 (FIGS. 3 and 4). Once the gauge device 10 is abutted against the oil drill pipe 18 at the terminal position 24 (FIG. 4), a direct measurement of the shoulder 32 remaining at the female end 16, with reference to a bench mark 36, can be made from depth gauge marks 28 stamped or formed along the length of the insert portion 12.

An outwardly directed annular flange 30 of the indicator portion 14 rests against the terminal position or point 24 defining a portion of the outer shoulder 32 of the female end 16 of the oil drill pipe 18. The annular flange 30 is automatically positioned perpendicularly relative to the longitudinal axes 20 and 22 so that any deviation of the outer shoulder 32 from a plane perpendicular to the longitudinal axes 20 and 22 can be visually seen. Additionally, the circumference of the female end 16 at the termination position 24 can be readily marked upon and measured on the annular flange 30 by marking around the outer shoulder 32 at the terminal position 24.

It will be understood by those familiar with the art that the oil drill pipe 18 is a section of a multisectioned drill pipe (not shown) used in the drilling for and exploration for oil. The entire length of drill pipe is rotated during the drilling operation. A drill pipe bore 34 is formed completely along the length of the drill pipe 18 coaxial with the longitudinal axis 20 for the conduction of fluids useful in the drilling operation. A male end of the drill pipe 18 (not shown) has tapered external threads adapted to threadably connect to tapered internal threads 26 of the female end 16. The male end also includes a flange or land against which the outer shoulder 32 of the female end 16 seats to define the joint. It is critical that the shoulder 32 conform as closely as possible to the flange or land of the male end so that a rigid sealed connection between adjacent pipe sections is maintained. An inner shoulder or throat 35 of convergent frustoconical shape extends from the innermost termination of the threads 26 to the bore 34.

In connecting and disconnecting sections of drill pipe 18, it is inevitable that the outer shoulder 32 will be worn or even damaged, and the bench mark 36 obliterated. In utilizing the drill pipe 18, it is normally best to make field repairs, which is a primary object of the gauge device 10. These field repairs include the grinding off of the outer shoulder or face 32 so that the terminal position 24 establishes a perfect abutting relationship between adjacent sections of drill pipe 18. In the course of grinding off the outer shoulder 32, the female end 16 is shortened. In order to limit the length the female end is shortened, the drill pipe 18 may or may not still have the bench mark 36 from which a measurement can be made to the outer shoulder or face 32. When there is no bench mark 36, then there exists a particular need for the gauge device 10 to establish the location of the bench mark 36, as will be seen hereinafter.

The insert portion 12 that fits within the female end 16 of the drill pipe 18 includes a handle 38, an elongated tubular body 40 and a frustoconically-shaped end cap 42. The elongated tubular body 40 is hollow so that the knob can be inserted within one end 44 thereof and the end cap 42 can be inserted into another end 46. The handle 38 is fixedly secured relative to the tubular body 40, as by welding. The end cap is also fixedly secured, but by releasable means, such as a screw 50.

The handle 38 (FIG. 2) has a circular cross section with respect to any plane transverse to the longitudinal axis 22. It includes a relatively larger knob 52 and an integral narrow neck 54 which interconnects the handle to a cylindrical plug 56. The plug 56 is inserted within the end 44 of the tubular body 40 and secured relative thereto.

The end cap 42 is also of integral construction. It includes an externally threaded end 58 (FIG. 2) insertable into the end 46 of the tubular body 40. The threaded end 58 is threadably connected to an annular collar 60, which annular collar is internally threaded so as to threadably connect to the external threads of the threaded end 58 of the end cap 42. The collar has a shallow threaded bore 62 formed therein and is slideable along the hollow portion of the tubular body 40. The set screw 50 passes through a bore 64 in the tubular body 40 and is threadably received by the shallow bore 62 of the collar 60. It is therefore seen that the collar 60 remains fixed relative to the tubular body and the end cap 42 can be threadably engaged or disengaged about threaded end 58 into or out of the collar 60. From the foregoing, it can be seen that various sizes of end caps 42 can be threadably connected to the collar 60 so that different types of drill pipe 18, having different lengths of shoulder 32 extending beyond the bench mark 36, can be gauged by the gauge device 10.

From the threaded end 58, the end cap 42 further includes an outwardly directed annular portion 66 and a leg portion 68, which together interconnect the threaded end 58 to a frustoconical portion 70. The leg portion 68 defines a cylindrical shape conformable to the tubular body 40. The frustoconical portion converges along the direction from end 44 to end 46, and is conformable to the throat 35 of the drill pipe 38 (FIGS. 3 and 4).

The indicator portion 14 includes the outwardly directed annular flange 30, an outer sliding tube or sleeve 72 and an annular connection flange 74 fixedly connected to the sliding sleeve 72 and the annular flange 30. The outer sliding sleeve 72 has an inside diameter substantially identical to the outside diameter of the elongated tubular body 40, both being of generally hollow cylindrical configuration. The connection flange 74 is welded to one end 73 of the sliding tube 72 and outwardly directed in a perpendicular relationship to the longitudinal axis 22 (FIG. 2). Four holes 76 are formed through the connection flange 74 and are aligned with threaded bores 78 formed at like locations in the annular flange 30. Bolts 80 rigidly connect the connection flange 74 to the annular flange 30.

A window 82 (FIG. 1) is formed at a second end 81 of the outer sliding sleeve 72. The window 82 is a rectangular opening in the outer sliding sleeve 72 that can be aligned over the depth gauge marks 28 on the elongated tubular body 40 in order to read the amount of shoulder remaining at end 16 of the drill pipe 18 relative to the bench mark 36. Pointers 84 (FIGS. 3 and 4) are available to read the amount of shoulder 32 remaining with respect to a zero point 85 established by the type of end cap 42 used. The end cap is changed depending on the manufacturer's specification for the specific drill pipe 18 in use.

The principal on which the gauge device 10 operates is dependent upon certain standards of the American Petroleum Institute. For each different type of drill pipe 18, the manufacturer gives an $L_{bc}$ distance, defined as the distance from the throat 35 to the shoulder 32. For any given drill pipe, there is no tolerance available shortening this $L_{bc}$ distance. The bench mark 36 is also a known distance relative to the $L_{bc}$ distance.

The American Petroleum Institute standard for length of available shoulder 32 is one sixteenth inch from the bench mark 36. Thus, a shoulder 32 of a box end 16 of a drill pipe 18 can be ground to within one sixteenth inch of the bench mark 36. For any given type of drill pipe 18, an end cap 42 is available of a length such that the pointers 84 are correlated to indicate the zero point 85 when the flange 30 abuts the shoulder 32 at a distance one sixteenth inch from the bench mark 36.

The operation of the gauge device 10 includes a first step of inserting the insert portion 12 into the female end 16 of the drill pipe 18 and establishing a conformable mated relationship between the frustoconical portion 70 of the end cap 42 and the throat 35 of the drill pipe 18 marking the transition area between the internal threads 26 and the drill pipe bore 34. Sufficient pressure must be manually applied to the handle 38 of the insert portion 12 in order to achieve a proper mated relationship. Once the mated relationship between the insert portion 12 and the drill pipe 18 is achieved, the longitudinal axis 20 of the drill pipe 18 is aligned with and coincident with the longitudinal axis 22 of the gauge device 10 (FIG. 3).

The indicator portion 14 is then slid along the tubular body 40 until the flange 30 contacts the drill pipe 18 at the terminal position 24 (FIG. 4). At this position, the pointers 84 can be used to directly read the shoulder remaining relative to one sixteenth inch from the bench mark 36. This measurement is important in order to insure that there is enough shoulder 32 available above the threads 26.

Any spacing between the annular flange 30 and the outer face or shoulder 32 can be visually observed by the user of the gauge device 10. "High" spots at the terminal position 24 can be marked and ground down. "Low" spots can be refaced and then ground. Additional measurement of the squareness of the outer shoulder 32 can be taken until the annular flange 30 fits flush against the outer shoulder 32.

Although the present invention has been described with a certain degree of detail in the foregoing description, departures may be made therefrom without departing from the spirit of the invention.

What is claimed is:

1. A gauge for measuring the squareness and length remaining for grinding of an outer shoulder of a box end of an internally threaded oil drill pipe shoulder of a box end of an internally threaded oil drill pipe having a bore formed therethrough, said oil drill pipe having a throat therein forming a transition area between said internal threads and said bore, comprising in combination:

an elongated generally cylindrically shaped insert received by said open throat and coaxial with an axis of said pipe including an end cap releasably connected to an elongated body of said insert at an innermost end thereof, said end cap conformable to and seated against said throat, said elongated body connected to a handle at an outermost end of said body; and an indicator slideable along said elongated body of said insert, said indicator including a tube slideable along said body, said tube having connected thereto and extending perpendicularly therefrom, an annular flange directed outwardly from the axis abuttable against said outer shoulder.

2. The invention defined in claim 1 wherein said body of said insert has gauge marks formed on an outer surface of said elongated body and said tube has a window formed therein for reading said gauge marks upon the flange of said indicator being abutted against said outer shoulder.

3. The invention defined in claim 1 wherein said end cap is removable from said elongated body and a second interchangeable cap conformable to a different shaped and dimensioned pipe throat connected to said elongated body of said insert portion.

4. The invention defined in claim 3 wherein each of said end caps include an externally threaded end receivable in an internally threaded end of said elongated body to thereby releasably connect one of said caps to the body.

5. The invention defined in claim 1 wherein said annular flange extends outwardly beyond the circumference of said box end of said drill pipe whereby the circumference of said drill pipe can be marked on said flange and measured.

6. A gauge for measuring the squareness of an outer shoulder and the amount of shoulder available for grinding at a box end of an internally threaded oil drill pipe having a bore formed therethrough, said oil drill pipe having a throat therein forming a transition area between said internal threads and said bore, comprising in combination:

alignment means conformable in a mated relationship with said throat for predeterminably positioning an elongated insert body having measurement indicia formed thereon within said box end of said drill pipe and for further aligning said body along a longitudinal axis of said drill pipe; and indicator means for reading a depth measurement from said indicia slideable along the length of the insert body, said indicator means having a flange oriented perpendicularly with respect to said longitudinal axis and an outer tube connected to said flange and slideable along the body, said flange abuttable against said outer shoulder and said outer tube having means for reading said indicia corresponding to the outer shoulder remaining on said box end relative to a preestablished bench mark.

* * * * *